(12) United States Patent
Woo et al.

(10) Patent No.: US 6,982,721 B2
(45) Date of Patent: Jan. 3, 2006

(54) DIVISION UNIT FOR USE IN 3D COMPUTER GRAPHICS SYSTEM

(75) Inventors: Ramchan Woo, Daejeon (KR); Hoi-Jun Yoo, Daejeon (KR)

(73) Assignee: Korea Advanced Institute of Science And Technology, Daejeon (KR)

( * ) Notice: Subject to any disclaimer, the term of this patent is extended or adjusted under 35 U.S.C. 154(b) by 131 days.

(21) Appl. No.: 10/858,536

(22) Filed: Jun. 2, 2004

(65) Prior Publication Data

US 2004/0254972 A1 Dec. 16, 2004

(30) Foreign Application Priority Data

Jun. 10, 2003 (KR) .................................. 10-2003-0037038

(51) Int. Cl.
  *G06T 15/00* (2006.01)
  *G06T 17/00* (2006.01)
  *G09G 5/00* (2006.01)

(52) U.S. Cl. .................... 345/582; 345/419; 345/428; 345/586; 345/561

(58) Field of Classification Search ......... 345/581–587, 345/605–607, 418–420, 428, 619, 643; 700/98, 700/118
See application file for complete search history.

(56) References Cited

U.S. PATENT DOCUMENTS

| | | | | |
|---|---|---|---|---|
| 5,594,846 A | * | 1/1997 | Donovan | 345/582 |
| 5,900,882 A | * | 5/1999 | Jee | 345/582 |
| 6,847,378 B2 | * | 1/2005 | Oberoi et al. | 345/600 |

* cited by examiner

Primary Examiner—Matthew C. Bella
Assistant Examiner—Wesner Sajous
(74) Attorney, Agent, or Firm—Oliff & Berridge, PLC

(57) ABSTRACT

Disclosed is a division unit for use in a three-dimensional (3D) computer graphics system. The division unit can reduce an area and power consumption thereof by removing more significant bits from homogeneous texture addresses u and v by the number of leading zeros included in a homogeneous texture address w and approximately carrying out a division operation for decreased data in texture mapping of the 3D computer graphics system. Therefore, the performance of real-time texture mapping is enhanced in a portable device operating at low power and hence 3D computer graphics can be realistically implemented.

5 Claims, 1 Drawing Sheet

DIVISION UNIT FOR USE IN 3D COMPUTER GRAPHICS SYSTEM

BACKGROUND OF THE INVENTION

1. Field of the Invention

The present invention relates to a division unit for use in a three-dimensional (3D) computer graphics system, and more particularly to a division unit for use in a three-dimensional (3D) computer graphics system that can reduce an area and power consumption thereof by removing more significant bits from homogeneous texture addresses u and v by the number of leading zeros included in a homogeneous texture address w and approximately carrying out a division operation in texture mapping of the 3D computer graphics system.

2. Description of the Related Art

A computer system including a personal computer (PC), a workstation game device, etc. efficiently provides visual information using graphics. Graphical elements consist of points, lines, surfaces, etc. Various types of graphical information can be displayed on a display unit provided in the computer system according to a combination of the graphical elements.

With the development of the computer system, the graphical information has been extended from simple two-dimensional graphics to three-dimensional (3D) computer graphics, such that a 3D graphical object can be realistically displayed.

A process of superimposing a two-dimensional (2D) image (texture) over the surface of a 3D graphical object to give apparent realism to the surface of the object is referred to as texture mapping.

Texture mapping is widely used because it can appropriately express the surface of an object through a predefined 2D image. In an intermediate process of the texture mapping, a perspective division operation is carried out.

Because a relatively large area and a relatively high power are required in order that the conventional division operation is implemented, it is difficult for the conventional division operation to be carried out by a portable device based on a low-power 3D graphic operation. Because a functional limitation is present when a 3D computer graphics system of the portable device performs the perspective division operation, it is difficult for a high-quality image to be produced.

SUMMARY OF THE INVENTION

Therefore, the present invention has been made in view of the above problems, and it is an object of the present invention to provide a division unit for use in a three-dimensional (3D) computer graphics system that can reduce an area and power consumption thereof by removing more significant bits from homogeneous texture addresses u and v by the number of leading zeros included in a homogeneous texture address w and approximately carrying out a division operation in texture mapping of the 3D computer graphics system.

In accordance with an aspect of the present invention, the above and other objects can be accomplished by the provision of a division unit for use in a three-dimensional (3D) computer graphic system, comprising: a leading zero detector for receiving a texture address value w and counting the number of leading zeros from the received texture address value w; at least one UV formatter for receiving texture address values u and v and removing more significant bits from the received texture address values u and v by the number of leading zeros detected by the leading zero detector, or for padding 0's subsequent to less significant bits of the texture address values u and v by the number of removed leading zeros after the removing; and at least one divider for dividing the values u and v newly formatted by the UV formatter by the value w.

Preferably, the values u and v are dividends and the value w is a divisor in the divider, and each of the dividends u and v and the divisor w is a value from which more significant bits may be removed by the number of leading zeros included in the value w.

Preferably, the less significant bits may be further removed from the divisor w.

Preferably, the less significant bits may be removed from each of the dividends u and v.

Preferably, when the less significant bits are removed from each of the dividends u and v, the less significant bits may be further removed from the divisor w.

When a division operation is carried out to produce final texture addresses in texture mapping of the 3D computer graphics system in accordance with the present invention, more significant bits are removed from the texture address values u and v by the number of leading zeros detected by the leading zero detector, or 0's are padded subsequently to less significant bits of the texture address values u and v by the number of removed leading zeros after the removing, such that an area and power consumption of the division unit can be reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. The preferred embodiments of the present invention will be disclosed for illustrative purposes, First, the principle of the present invention will be described.

The relationship between homogeneous texture addresses u, v and w and final texture addresses U and V is shown in the following Equation 1.

$$U=u/w \text{ and } V=v/w \quad \text{Equation 1}$$

As shown in the above Equation 1, the homogenous texture addresses u, v and w are required so that the final texture addresses U and V can be calculated. In relation to values of the final texture addresses U and V, $0 \leq (U,V) \leq 1$. Using this relationship and the above Equation 1, the following Equation 2 can be produced.

$$w \geq u \text{ and } w \geq v \quad \text{Equation 2}$$

That is, w is equal to or greater than u, and is equal to or greater than v.

In accordance with the present invention, a division operation is approximately carried out using the above-described principle.

Figure 1:
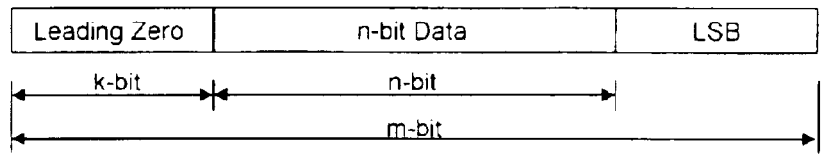
FIG. 1 shows the binary bit format of a homogeneous texture address w for explaining the operation of a division unit for use in a three-dimensional (3D) computer graphics system in accordance with the present invention.

FIG. 1 shows the binary bit format of a homogeneous texture address w for explaining the operation of a division unit for use in a three-dimensional (3D) computer graphics system in accordance with the present invention.

When the homogeneous texture address w is expressed as m binary bits as shown in FIG. 1, leading zeros corresponding to k bits are present in more significant bits. A latter field subsequent to the k bits can be expressed by 0's and/or 1's. The latter field can be defined by n-bit data subsequent to the k leading zero bits and (m-k-n) less significant bits subsequent to the n-bit data. The homogeneous texture address w consists of m bits. Actually, important information in the homogeneous texture address w can be the n-bit data and the less significant bits subsequent to the n-bit data.

Figure 2:
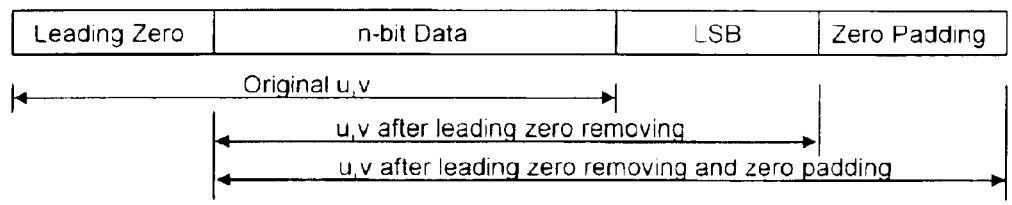
FIG. 2 shows the binary bit format of homogeneous texture addresses u and v for explaining the operation of the division unit for use in the 3D computer graphics system in accordance with the present invention.

FIG. 2 shows the binary bit format of homogeneous texture addresses u and v for explaining the operation of the division unit for use in the 3D computer graphics system in accordance with the present invention.

As shown in FIG. 2, the homogeneous texture addresses u and v can be expressed by the m-bit format similarly to the homogeneous texture address w, respectively. Each of the homogeneous texture addresses u and v comprises leading zero bits, n-bit data and less significant bits.

Because values of the addresses u and v are equal to or less than a value of the address w as shown in the above Equation 2, respectively, the number of leading zeros included in the address u or v can be equal to or greater than the number of leading zeros included in the address w.

Even though more significant bits are removed from the address u or v by the number of leading zeros included in the address w, a value of the address u or v does not vary.

Consequently, when the approximated division operation is performed using the principle of the present invention, an area and power consumption of the division unit can be reduced.

Figure 3:
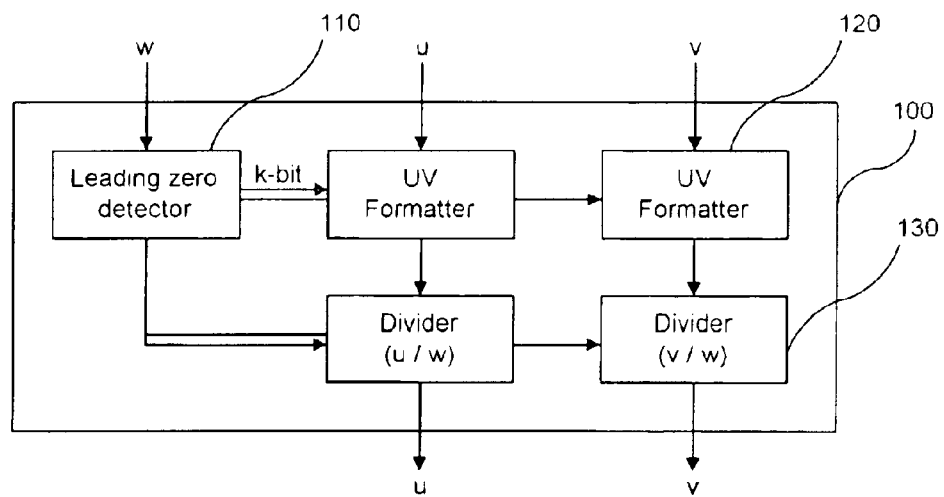
FIG. 3 is a block diagram illustrating the division unit for use in the 3D computer graphics system in accordance with the present invention.

FIG. 3 is a block diagram illustrating the division unit for use in the 3D computer graphics system in accordance with the present invention.

As shown in FIG. 3, the division unit 100 carries out a perspective division operation in texture mapping of the 3D computer graphics system. The division unit 100 comprises: a leading zero detector (LZD) 110 for receiving a texture address value w and counting the number of leading zeros (k) from the received texture address value w; UV formatters (UVFs) 120 for receiving texture address values u and v and removing more significant bits from the received texture address values u and v by the number of leading zeros (k) detected by the LZD 110, or for padding 0's subsequent to less significant bits of the texture address values u and v by the number of removed leading zeros after the removing; and dividers (DIVs) 130 for dividing newly formatted values u and v by the value w.

The operation of the present invention will be described.

When the texture address values u, v and w are configured by m bits, respectively, the conventional division unit must carry out a division operation of "m-bit value/m-bit value", such that the division unit requires an area and power consumption thereof in proportion to the length of m bits.

In accordance with the present invention, because k leading zeros are removed from the texture address value w and the UV formatters remove more significant bits from the texture address values u and v by the number of k bits and pad 0's to less significant bits of the texture address values u and v, respectively, the division unit performs the division operation of "m-bit value/(m-k)-bit value" where m>n in place of the conventional division operation of "m-bit value/m-bit value". Consequently, an area and power consumption of the division unit can be reduced.

In this case, when the division operation is approximately carried out after less significant bits are further removed from a value w from which the leading zeros are removed, the division unit can only perform the division operation of "m-bit value/n-bit value", such that the area and power consumption of the division unit can be further reduced.

Moreover, the division unit in accordance with the present invention can carry out the division operation of "(m-k)-bit value/(m-k)-bit value" in a state where the UV formatters completely remove more significant bits from the texture address values u and v, such that the area and power consumption of the division unit can be further reduced.

In this case, when less significant bits are removed from the value w from which leading zeros are removed, the division unit can carry out the division operation of "(m-k)-bit value/n-bit value", such that the area and power consumption of the division unit can be further reduced.

As apparent from the above description, the present invention provides a division unit for use in a three-dimensional (3D) computer graphics system that can reduce an area and power consumption thereof by removing more significant bits from homogeneous texture addresses u and v by the number of leading zeros included in a homogeneous texture address w and approximately carrying out a division operation for decreased data in texture mapping of the 3D computer graphics system.

Therefore, the performance of real-time texture mapping is enhanced in a portable device operating at low power and hence 3D computer graphics can be realistically implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A division unit for use in a three-dimensional (3D) computer graphic system, comprising:

a leading zero detector for receiving a texture address value w and counting the number of leading zeros from the received texture address value w;

at least one UV formatter for receiving texture address values u and v and removing more significant bits from the received texture address values u and v by the number of leading zeros detected by the leading zero detector, or for padding 0's subsequent to less significant bits of the texture address values u and v by the number of removed leading zeros after the removing; and at least one divider for dividing the values u and v newly formatted by the UV formatter by the value w.

2. The division unit according to claim 1, wherein the values u and v are dividends and the value w is a divisor in the divider, and wherein each of the dividends u and v and the divisor w is a value from which more significant bits are removed by the number of leading zeros included in the value w.

3. The division unit according to claim 2, wherein the less significant bits are further removed from the divisor w.

4. The division unit according to claim 2, wherein the less significant bits are removed from each of the dividends u and v.

5. The division unit according to claim 4, wherein the less significant bits are further removed from the divisor w.

* * * * *